US008855972B2

(12) United States Patent
Bourgeois et al.

(10) Patent No.: US 8,855,972 B2
(45) Date of Patent: *Oct. 7, 2014

(54) MANUFACTURE OF HEAT TRACE CABLE, DESIGN, INSTALLATION, AND MANAGEMENT, AND METHOD THEREOF

(75) Inventors: Neil Bourgeois, Edmonton (CA); Elson Castillo, Edmonton (CA); Xiaorong Deng, Edmonton (CA); Michael H. Easley, Katy, TX (US); Rodney E. Gilmour, Edmonton (CA); Mitchell A. Todd, Tigard, OR (US); Cara J. Hensley, Houston, TX (US); Bruno Guinand, Mont Saxonnex (FR); Steven Noel, Edmonton (CA); Donald L. Hunter, Pasadena, TX (US); Brent Podruzny, Edmonton (CA); Willem P. Westerhuijs, Vijfhuizen (NL)

(73) Assignee: Pentair Thermal Management LLC, Menlo Park, CA (US)

( * ) Notice: Subject to any disclaimer, the term of this patent is extended or adjusted under 35 U.S.C. 154(b) by 1086 days.

This patent is subject to a terminal disclaimer.

(21) Appl. No.: 12/739,365

(22) PCT Filed: Oct. 23, 2008

(86) PCT No.: PCT/US2008/080916
§ 371 (c)(1),
(2), (4) Date: Sep. 1, 2010

(65) Prior Publication Data
US 2012/0109588 A1     May 3, 2012

Related U.S. Application Data

(63) Continuation-in-part of application No. 11/983,056, filed on Nov. 5, 2007, now Pat. No. 7,917,339.

(60) Provisional application No. 60/982,369, filed on Oct. 24, 2007, provisional application No. 60/982,376, filed on Oct. 24, 2007, provisional application No. 60/982,373, filed on Oct. 24, 2007, provisional application No. 60/984,780, filed on Nov. 2, 2007, provisional application No. 60/984,772, filed on Nov. 2, 2007.

(51) Int. Cl.
*G06F 17/50* (2006.01)

(52) U.S. Cl.
CPC ........ *G06F 17/5009* (2013.01); *G06F 2217/06* (2013.01); *G06F 17/5086* (2013.01); *G06F 2217/34* (2013.01); *G06F 17/50* (2013.01); *G06F 17/509* (2013.01); *G06F 2217/80* (2013.01)
USPC ...................... 703/1; 703/6; 345/419; 700/98

(58) Field of Classification Search
None
See application file for complete search history.

(56) References Cited

U.S. PATENT DOCUMENTS 4,791,277 A * 12/1988 Montierth et al. ............ 219/535
5,086,836 A *  2/1992 Barth et al. ................... 165/164

(Continued)

OTHER PUBLICATIONS

C. Lindsay, J. Beene, R. D. L. Klerk, "Automating Trace Heating Designs from Plant 3-D models" Jun. 13-15, 2007, pp. 1-6.*

(Continued)

*Primary Examiner* — Akash Saxena
*Assistant Examiner* — Kibrom Gebresilassie
(74) *Attorney, Agent, or Firm* — Quarles & Brady LLP

(57) ABSTRACT

The manufacture and installation of heat trace systems, particularly cables, are controlled from comprehensive controls in the design and management of the heat trace systems.

4 Claims, 14 Drawing Sheets

(56) References Cited

U.S. PATENT DOCUMENTS

| | | | | |
|---|---|---|---|---|
| 5,294,780 | A * | 3/1994 | Montierth et al. | 219/535 |
| 5,517,428 | A * | 5/1996 | Williams | 703/1 |
| 5,740,341 | A * | 4/1998 | Oota et al. | 345/420 |
| 6,681,140 | B1 * | 1/2004 | Heil | 700/95 |
| 6,751,744 | B1 * | 6/2004 | Allen et al. | 713/401 |
| 7,398,193 | B2 * | 7/2008 | Araki et al. | 703/9 |
| 7,752,065 | B2 * | 7/2010 | Buzz | 705/7.23 |
| 7,917,339 | B2 * | 3/2011 | Bourgeois et al. | 703/1 |
| 8,155,928 | B2 * | 4/2012 | Nonaka et al. | 703/1 |
| 8,175,446 | B2 * | 5/2012 | Russegger et al. | 392/473 |
| 8,249,909 | B2 * | 8/2012 | Watanabe et al. | 705/7.23 |
| 8,554,520 | B2 * | 10/2013 | Reghetti et al. | 703/1 |
| 8,600,706 | B2 * | 12/2013 | Reghetti et al. | 703/1 |
| 2001/0032064 | A1 * | 10/2001 | Araki et al. | 703/6 |
| 2003/0050871 | A1 * | 3/2003 | Broughton | 705/28 |
| 2003/0074164 | A1 * | 4/2003 | Simmons et al. | 703/1 |
| 2005/0149305 | A1 * | 7/2005 | Araki et al. | 703/9 |
| 2006/0229855 | A1 * | 10/2006 | Araki et al. | 703/9 |
| 2009/0119073 | A1 * | 5/2009 | Bourgeois et al. | 703/1 |
| 2009/0125352 | A1 * | 5/2009 | Miyake et al. | 705/7 |
| 2009/0187384 | A1 * | 7/2009 | Nonaka et al. | 703/1 |
| 2013/0132040 | A1 * | 5/2013 | Shook et al. | 703/1 |

OTHER PUBLICATIONS

C. Lindsay, J. Beene, R. Klerk, "Automating Trace Heating Designs from Plant 3-D Models" pp. 1-6, Jun. 2007.*

* cited by examiner

MANUFACTURE OF HEAT TRACE CABLE, DESIGN, INSTALLATION, AND MANAGEMENT, AND METHOD THEREOF

This application is a continuation-in-part of U.S. patent application Ser. No. 11/983,056 filed Nov. 5, 2007, now U.S. Pat. No. 7,917,339, and claims the benefit of U.S. Provisional Application Ser. No. 60/982,369 filed Oct. 24, 2007; U.S. Provisional Application Ser. No. 60/982,376 filed Oct. 24, 2007; U.S. Provisional Application Ser. No. 60/982,373 filed Oct. 24, 2007; U.S. Provisional Application Ser. No. 60/984,780 filed Nov. 2, 2007; and U.S. Provisional Application Ser. No. 60/984,772 filed Nov. 2, 2007.

BACKGROUND

The present invention relates to the manufacture of heat trace cable, the installation of a heat trace system, and the design and management thereof.

Heat trace systems are employed to heat and maintain pipes and/or materials carried by pipes at desired temperatures or within desired temperature ranges. Most industrial applications of heat tracing involve unique configurations and heating requirements. Applications for automated heat trace system design exist. Typically, such applications require that pipe system data be manually extracted from pipe system design files and entered into the application. Such manual extraction is error-prone and time-consuming. Moreover, in typical applications, the consistency of data used for calculating heat loss and selecting heat trace system components, generating isometric drawings of the heat trace system, and populating the border information on the drawings can not be easily validated.

Accordingly, a need therefore exists for improvement in the manufacture of heat trace cable, and the installation of heat trace systems. The present invention addresses these needs, among others.

SUMMARY OF THE INVENTION

The present invention provides a method for installing at least a portion of a heat trace system for at least a portion of a pipe system that includes (1) receiving three dimensional pipe system data, wherein the pipe system data includes pipe locations in the pipe system, (2) automatically extracting data associated with one or more pipe system components included the received pipe system data, (3) determining one or more heat trace system components for the portion of the pipe system based at least in part on the extracted data and, (4) installing at least a portion of the determined heat trace system along at least a portion of the pipe system.

The present invention also provides a method for manufacturing a heat trace cable that includes (1) receiving three dimensional pipe system data, wherein the pipe system data includes pipe locations in the pipe system, (2) automatically extracting data associated with one or more pipe system components included the received pipe system data, (3) determining the length of a heat trace cable for the portion of the pipe system based at least in part on the extracted data and, (4) manufacturing the heat trace cable to the determined length.

Additionally, the present invention provides a method for determining at least a portion of a heat trace system for at least a portion of a pipe system that includes (1) receiving pipe system data, wherein the pipe system data includes data associated with pipe system components, (2) receiving a selection of a pipe system component, (3) automatically extracting data associated with a set of one or more pipe system components including the selected pipe system component from the received pipe system data and, (4) determining one or more heat trace system components for the set of pipe system components based at least in part on the extracted data.

Furthermore, the present invention provides a system for determining at least a portion of a heat trace system for at least a portion of a pipe system having a processor configured to (1) receive pipe system data, wherein the pipe system data includes data associated with pipe system components, (2) receive a selection of a pipe system component, (3) automatically extract data associated with a set of one or more pipe system components including the selected pipe system component from the received pipe system data and, (4) determine one or more heat trace system components for the set of pipe system components based at least in part on the extracted data, and a memory coupled to the processor and configured to provide instructions to the processor.

Even furthermore, the present invention provides a computer program product for determining at least a portion of a heat trace system for at least a portion of a pipe system, the computer program product being embodied in a computer readable medium and comprising computer instructions for (1) receiving pipe system data, wherein the pipe system data includes data associated with pipe system components, (2) receiving a selection of a pipe system component, (3) automatically extracting data associated with a set of one or more pipe system components including the selected pipe system component from the received pipe system data and, (4) determining one or more heat trace system components for the set of pipe system components based at least in part on the extracted data.

The present invention incorporates a three dimensional (3D) model representation of the pipe on which the heat trace cable is to be installed. Use of this 3D model representation enables a more accurate calculation of heating trace cable length to be produced by correcting errors inherent in the use of centerline calculations. As such, production runs are capable of more accurate heating cable length.

BRIEF DESCRIPTION OF THE DRAWINGS

Various embodiments of the invention are disclosed in the following detailed description and the accompanying drawings.

DETAILED DESCRIPTION OF THE PREFERRED EMBODIMENT

Figure 1:
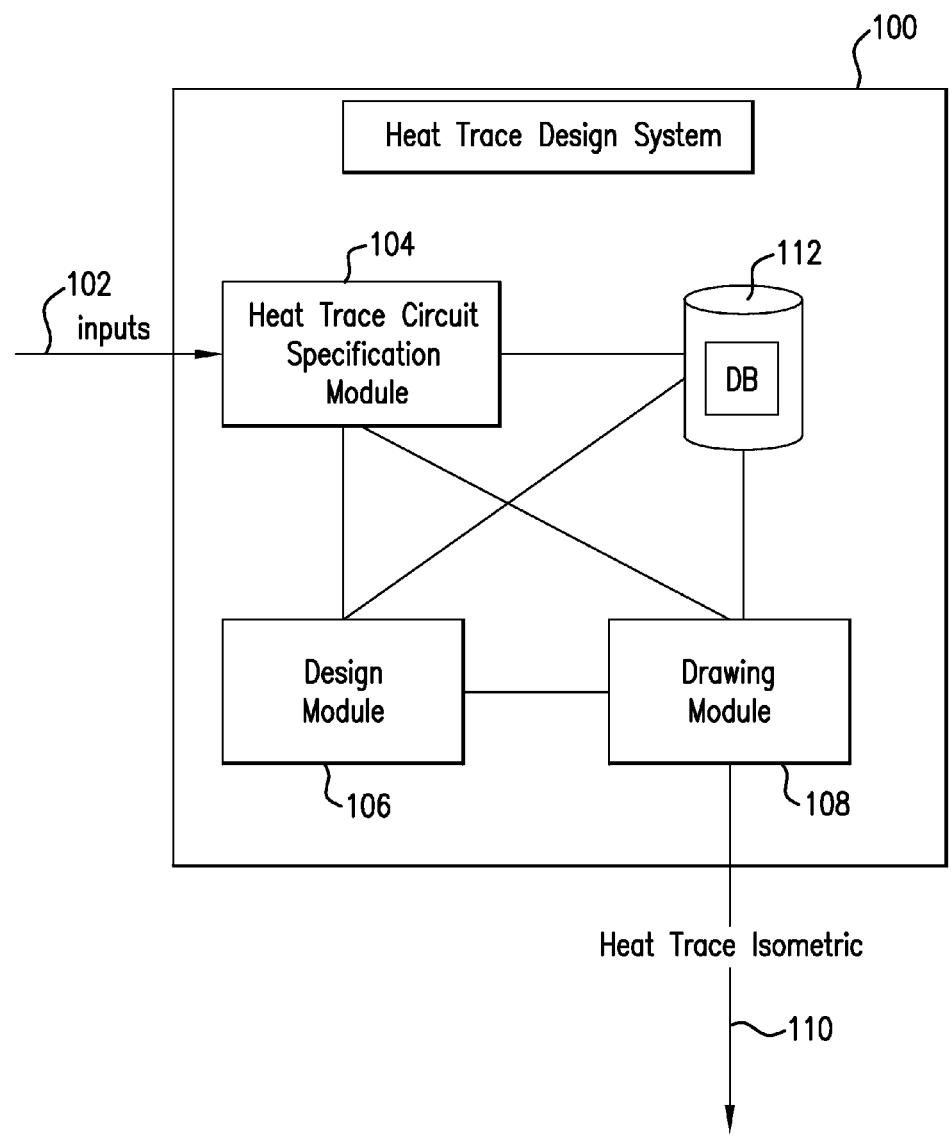
FIG. 1 is a diagram illustrating an embodiment of a heat trace design system 100.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component, such as a processor or a memory described as being configured to perform a task, includes both a general component that is temporarily configured to perform the task at a given time and a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a pipe system component refers to any appropriate component of a pipe system. Examples of pipe system components include pipes, flanges, valves, supports, instruments, etc. In some embodiments, a pipe system is modularly designed by assembling together individually constructible modules. Such a module is referred to herein as a work breakdown structure (WBS) element. As used herein, a heat trace system component refers to any appropriate component of a heat trace system. Examples of heat trace system components include heating elements or cables, power connection boxes, splice boxes, tee boxes, end seals, attachment devices to attach heat trace system components to corresponding pipe system components, thermostats, controllers, etc. As used herein, a user of a heat trace design system may comprise a person, process, or application.

In some embodiments, the heat trace system of a pipe system may comprise one or more heat trace circuits. Each heat trace circuit is associated with a portion of the pipe system. In some embodiments, the specification of a heat trace circuit (i.e., the specification of the portions of a pipe system to be traced by the heat trace circuit) comprises the specification of one or more pipe segments. As used herein, a pipe segment refers to a (e.g., software) container that includes data associated with a set of one or more contiguous pipe system components that share heat loss properties and/or heater selection criteria such as pipe bore and material, insulation type and thickness, and design temperatures. A pipe segment or container is populated with data needed for heat trace system design. Examples of such data include pipe length, bore, and material; the numbers and/or types of heat sinks (e.g., flanges, valves, supports, instruments); etc. Pipe segments may be hierarchically arranged and/or defined, for example, for each heat trace circuit. A pipe segment hierarchy indicates how various components are logically connected and may include a parent pipe segment and one or more child pipe segments.

FIG. 1 is a diagram illustrating an embodiment of a heat trace design system 100. Heat trace design system 100 receives one or more inputs 102 including, for example, data associated with a pipe system that is at least in part desired to be heat traced, configuration information and/or parameters, selections and/or specifications of portions of the pipe system that are desired to be heat traced, etc. Heat trace circuit specification module 104 of heat trace design system 100 receives specifications of heat trace circuits of the pipe system. In some embodiments, the specification of a heat trace circuit comprises the specifications of one or more associated pipe segments. In some embodiments, as described in detail below, in response to receiving a particular pipe segment or container a selection of a pipe system location, data associated with pipe system components in the vicinity of the selected pipe system location that share heat loss characteristics is automatically extracted from available pipe system data and used to populate the associated pipe segment or container, at least in part eliminating the need for manual extraction and/or input of such data. Heat trace circuit specification module 104 may be employed to define and/or populate one or more pipe segments comprising the heat trace circuits of a heat trace system of the pipe system. A heat trace circuit or part thereof defined using heat trace circuit specification module 104 may be processed by design module 106. Design module 106 performs heat loss calculations and selects appropriate heat trace system components for the heat trace circuit. Design module 104, for example, may comprise Tyco Thermal Controls' TraceCalc Pro® or another similar automated heat-tracing design application. Heat trace circuit routings defined using heat trace circuit specification module 104 and/or calculations and/or heat trace system component selections by design module 106 are employed by drawing module 108 to automatically generate a drawing 110 of at least a portion of the heat trace system. In the given example, the output of heat trace design system 100 comprises one or more heat trace isometric drawings 110. Drawing module 108, for example, may comprise ISOGEN® or another similar automated isometric drawing generating application. Information related to each heat trace circuit designed using heat trace design system 100 is, in some embodiments, stored in a common database 112 or other storage location accessible to each module 104, 106, and 108 so that each module 104, 106, and 108 operates on the same set or instance of pipe and heat trace design data, eliminating or at least reducing the risk of error.

Figure 2:
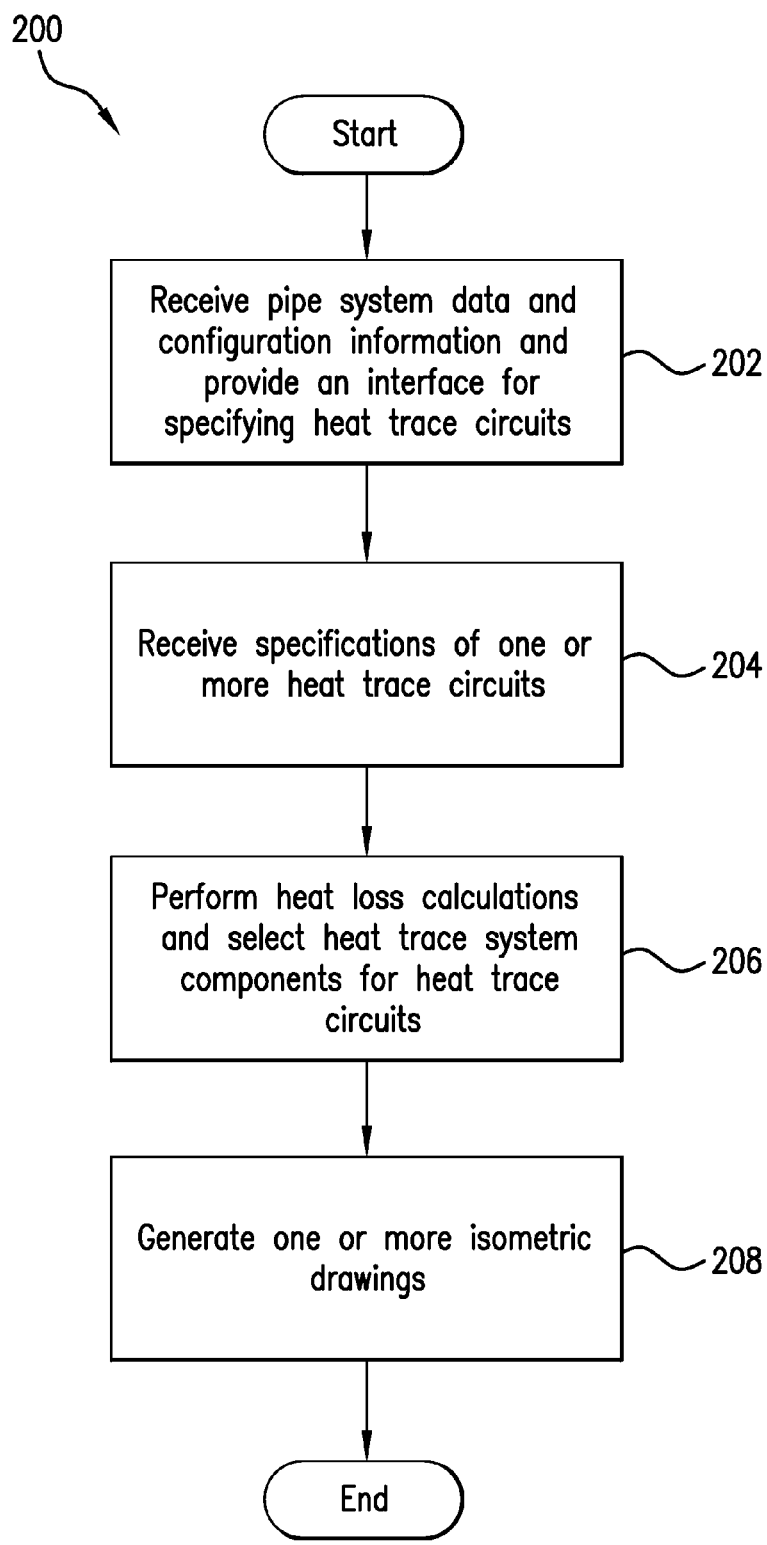
FIG. 2 illustrates an embodiment of a process for designing a heat trace system or part thereof.

FIG. 2 illustrates an embodiment of a process for designing a heat trace system or part thereof. In some embodiments, process 200 is employed by heat trace design system 100 of FIG. 1. Process 200 starts at 202 at which pipe system data and configuration information is received and an interface for specifying heat trace circuits (e.g., associated pipe segments) is provided. At 204, specifications of one or more heat trace circuits are received, for example, through the interface provided at 202. In some embodiments, a specification of a heat trace circuit comprises specifications of one or more pipe segments that comprise the heat trace circuit. The pipe segments associated with each heat trace circuit may be hierarchically arranged and/or defined. At 206, heat loss calculations are performed and heat trace system components are selected for the heat trace circuits of 204. At 208, one or more (isometric) drawings of the heat trace system or parts thereof are generated, for example, based at least in part on the specifications of 204 and/or the calculations and/or heat trace system component selections of 206. Process 200 subsequently ends. In some embodiments, one or more of steps 204-208 may be performed on various increments of the heat trace system being designed so that the design can be incrementally validated. In many cases, incremental validation rather than validation only at the end of the design process results in a heat trace system design that better meets desired specifications.

Figure 3:
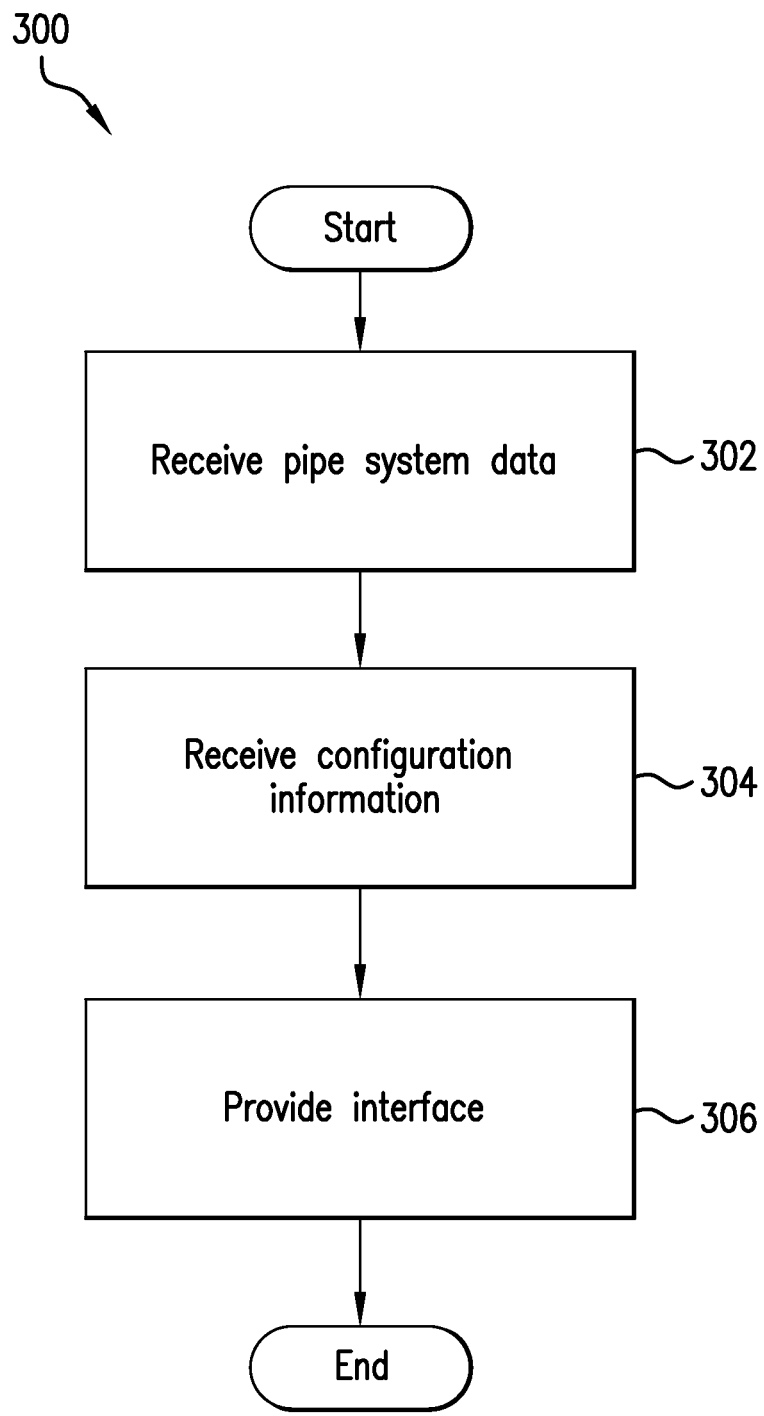
FIG. 3 illustrates an embodiment of a process for configuring a heat trace design system.

FIG. 3 illustrates an embodiment of a process for configuring a heat trace design system. In some embodiments, process 300 is employed at 202 of process 200 of FIG. 2. Process 300 starts at 302 at which data associated with a pipe system that is at least in part desired to be heat traced is received. The pipe system data received at 302 includes pipe system design files such as three-dimensional model data, e.g., in IDF and PCF files; process data, such as the types of materials to be carried by the various pipes in the pipe system and/or the desired temperatures and/or temperature ranges of the materials and/or at which the pipes are to be maintained; etc. At 304, configuration information is received. The configuration information received at 304 is employed, for example, to configure or set-up the heat trace design system for a particular pipe system to be heat traced. The configuration information received at 304 may include specifications of various design parameters. For example, the configuration information of 304 may include translations of one or more pipe system component identifiers included in the pipe system data received at 302 to corresponding identifiers that are recognized and used by the heat trace design system; specifications of one or more work breakdown structure elements in the pipe system; heat trace system component preferences such as the types and/or models of components to be used in the heat trace system and/or allowed in the bill of materials of the heat trace system; identifiers to be used for heat trace system components; units to be used for the pipe system and/or the heat trace system; current and/or voltage values to be used; area classification information, e.g., whether the pipe system is to be deployed in a hazardous environment; etc. At 306, an interface for selecting and/or specifying pipe segments associated with heat trace circuits of the pipe system is provided, and process 300 ends. In some embodiments, the interface provided at 306 includes a three-dimensional representation of at least a portion of the pipe system rendered using the pipe system data received at 302. Such a three-dimensional representation or model provides, for example, an intuitive view of the size and geometry of the pipe system and can be used by a user of the heat trace design system to select one or more segments of the pipe system to be heat traced. In some embodiments, the interface provided at 306 includes options to show and/or create pipe segment hierarchies for heat trace circuits of the pipe system.

A user may create or specify one or more pipe segments or containers of various types for each heat trace circuit, for example, using the interface provided at 306 of process 300 of FIG. 3. A pipe segment is empty until populated with pipe system data such as using process 400 of FIG. 4. As described with respect to process 400, in some embodiments, a pipe segment can be at least in part automatically populated, e.g., with pipe system data needed for heat trace system design. In some embodiments, a selection of a pipe system location by a user with respect to a selected pipe segment results in the pipe segment to at least in part be automatically populated with data associated with the portion of the pipe system between the nearest boundary conditions on either side of the selected location.

Figure 4:
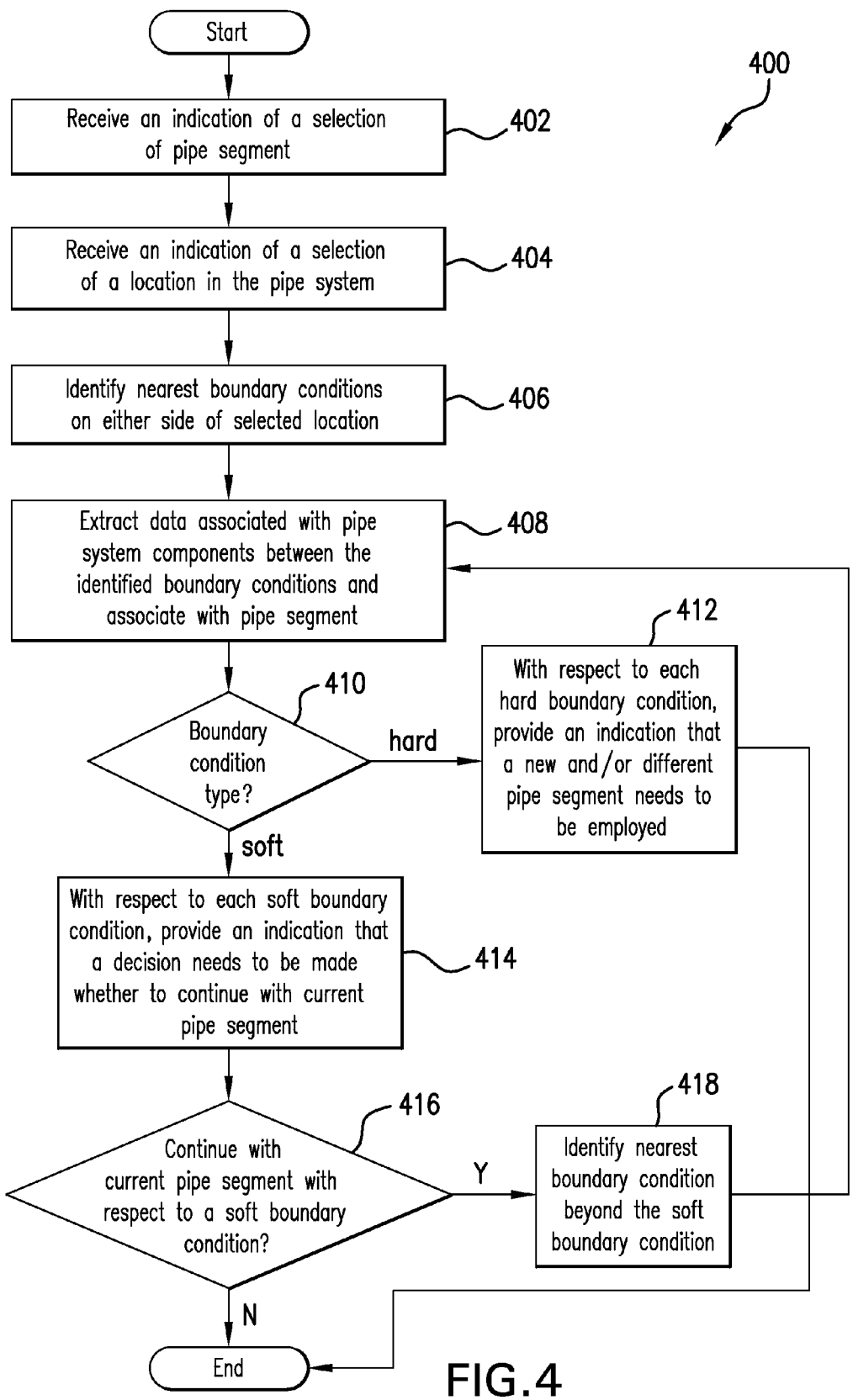
FIG. 4 illustrates an embodiment of a process for receiving a specification of a pipe segment.

FIG. 4 illustrates an embodiment of a process for receiving a specification of a pipe segment. In some embodiments, process 400 is employed at 204 of process 200 of FIG. 2. Process 400 starts at 402 at which an indication of a selection of a pipe segment or container is received. For example, the indication of 402 may be received in response to a user selecting or clicking on the pipe segment as the current pipe segment, for example, via the interface provided at 306 of process 300 of FIG. 3. In some embodiments, 402 includes receiving an indication of a creation of the pipe segment, for example, within a hierarchy of pipe segments associated with a particular heat trace circuit. At 404, an indication of a selection of a location in the pipe system is received. For example, the indication of 404 may be received in response to the user selecting or clicking on the location in a three-dimensional model of the pipe system provided to the user, for example, via the interface provided at 306 of process 300 of FIG. 3. At 406, the nearest boundary conditions on either side of the selected location are automatically identified. A boundary condition, as described further below, comprises a pipe system characteristic that may affect heat loss properties. At 408 data and/or design parameters related to one or more pipe system components between the identified boundary conditions are automatically extracted from data available for the pipe system (e.g., from the data/configuration information received at 302 and 304 of process 300 of FIG. 3) and associated with the selected pipe segment. In some embodiments, the pipe system components automatically associated with the pipe segment at 408 comprise the maximum amount of the pipe system along either side of the selected location and contiguous to the selected location that can be automatically determined to share heat loss characteristics. The automatic extraction of the pipe system components between the identified boundary conditions as well as associated design parameters and/or properties from available pipe system data and/or configuration information eliminates the need for a user to manually determine and specify such information, reducing the likelihood of error as well as design time. In some embodiments, 408 includes highlighting in the three-dimensional model of the pipe system the pipe system components between the boundary conditions that are automatically associated with the selected pipe segment so that the user can easily discern which pipe system components have been associated with the selected pipe segment.

Figure 5:
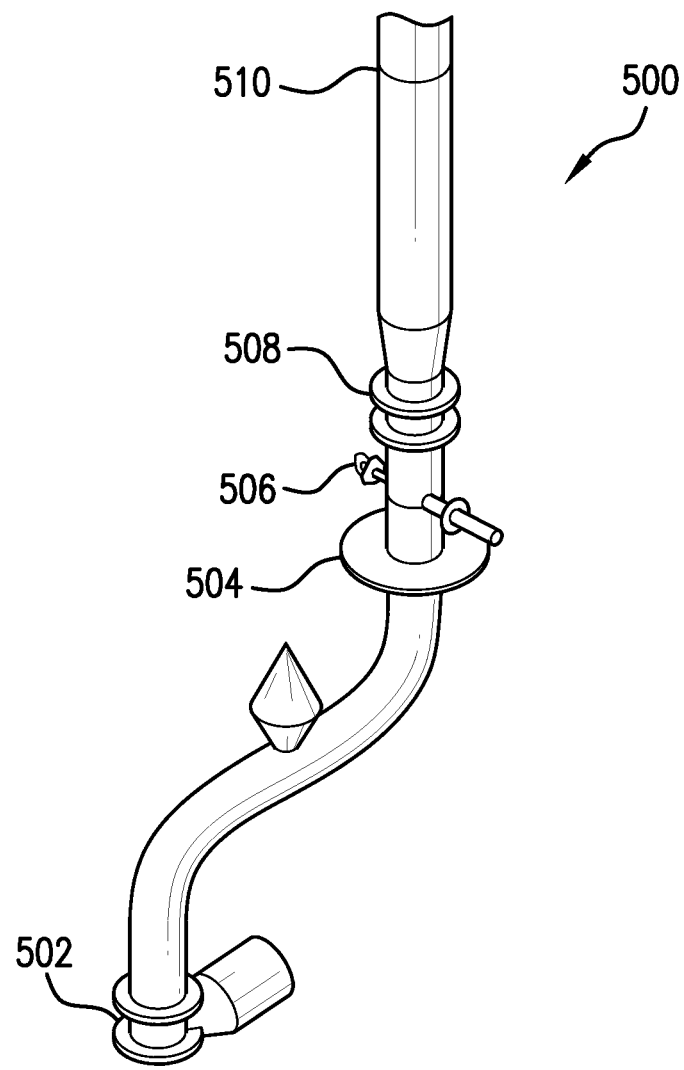
FIG. 5 illustrates examples of some boundary conditions.

In various embodiments, any appropriate boundary conditions and/or classifications of boundary conditions may be defined. In some embodiments, the possible boundary conditions comprise two different types: hard boundary conditions and soft boundary conditions. A hard boundary condition indicates that pipe system components at and/or beyond the hard boundary condition need to be included in a new or different pipe segment since heat loss characteristics are likely to change at and/or beyond the hard boundary condition. Examples of hard boundary conditions include changes in pipe bore, changes in pipe material, changes in pipe insulation, the end of a pipeline, etc. In some embodiments, a pipe may be allowed to be covered by only a single heat trace circuit. In such cases, a pipe covered by another heat trace circuit comprises a hard boundary condition. Alternatively, in some embodiments, a pipe may be covered by a plurality of heat trace circuits, for example, for redundancy or to more quickly heat the pipe. In such cases, a pipe covered by another heat trace circuit comprises a soft boundary condition. A soft boundary condition indicates that a decision needs to be made (e.g., by the user) whether to include pipe system components at and/or beyond the soft boundary condition in the current pipe segment or in a new or different pipe segment. In some embodiments, a new or different pipe segment needs to be selected for pipe system components at and/or beyond a soft boundary condition if heat loss properties of the pipe system are at least expected to change. Soft boundary conditions also help users determine when new heating cables need to be used such as the point where a module break occurs and installing the cable at the module yard. When this happens, two separate cables may be that are spliced when the modules are installed at site. Examples of soft boundary conditions include wall and/or floor penetrations in the pipe system, tees in the pipe system, a change in work breakdown structure elements, etc. A wall and/or floor penetration is a soft boundary condition, for instance, because environmental conditions (such as ambient temperature, wind speed, etc.) on either side of the wall or floor may be the same (in which case the same pipe segment may be employed) or may be different (in which case a new or different pipe segment needs to be selected since environmental conditions affect heat loss). In some embodiments, the pipe system data, e.g., received at 302 of process 300 of FIG. 3, associated with one or more pipe system components may include an indicator or flag that specifies whether the corresponding pipe system component is to be heat traced. For example, a flag with value "1" may indicate that an associated pipe system component is to be heat traced, and a flag with value "0" may indicate that an associated pipe system component is not to be heat traced. In some embodiments, a tracing indicator change (i.e., a flag value change) comprises a soft boundary condition. A decision is requested by a user, for example, in case one or more tracing indicators have been incorrectly specified in the original pipe system data. FIG. 5 illustrates examples of some boundary conditions. A three-dimensional portion of a pipe system 500 is depicted. The given example illustrates the end of a pipeline 502, a floor penetration 504, a tee 506, a pipe bore change 508, and a tracing indicator change 510 which in some cases is represented by a change in color of the pipe.

Returning to process 400 of FIG. 4, the type of each identified boundary condition is determined at 410. If it is determined at 410 that one or more hard boundary conditions were identified, an indication is provided at 412 with respect to each identified hard boundary condition that a new and/or different pipe segment needs to be employed for pipe system components at and/or beyond the hard boundary condition, and process 400 ends. If it is determined at 410 that one or more soft boundary conditions were identified, an indication is provided at 414 with respect to each identified soft boundary condition that a decision needs to made whether to continue with the current pipe segment or to create a new or use a different pipe segment for pipe system components at and/or beyond the soft boundary condition. At 416 it is determined whether an indication to continue with the current pipe segment (i.e., the pipe segment selected at 402) is received with respect to a soft boundary condition. If an indication to continue with the current pipe segment is received with respect to a soft boundary condition at 416, at 418 a nearest boundary condition beyond the soft boundary is identified, and process 400 continues at step 408. If an indication to continue with the current pipe segment is not received with respect to a soft boundary condition at 416, process 400 ends. In various embodiments, a new and/or different pipe segment selected for pipe system components at and/or beyond a boundary condition may be a part of the same heat trace circuit as the pipe segment selected at 402 or of a different heat trace circuit.

In some embodiments, using process 400, much of the data needed for heat loss calculations and/or heat trace system component selection is automatically extracted from available pipe system data and used to populate pipe segments. In addition to accelerating the design process, the automatic rather than manual extraction of such data eliminates or at least reduces the likelihood of errors. In some embodiments, user input is only required at boundary conditions. In such cases, the boundary conditions give the user opportunities to make design decisions. For example, a user may select to continue populating a current pipe segment (e.g., beyond a soft boundary condition if the heat loss properties are determined not to change beyond the soft boundary condition), a user may select and/or specify a new and/or different pipe segment if heat loss properties are expected to change beyond a boundary condition, a user may decided to continue with a pipe segment of a different heat trace circuit beyond a boundary condition and/or not to heat trace the pipe system beyond a boundary condition, etc. In some embodiments, decisions at one or more boundary conditions may at least in part be automated based on the possible choices that can be made at the boundary conditions, and user input may not be required and/or may be optional.

Figure 6:
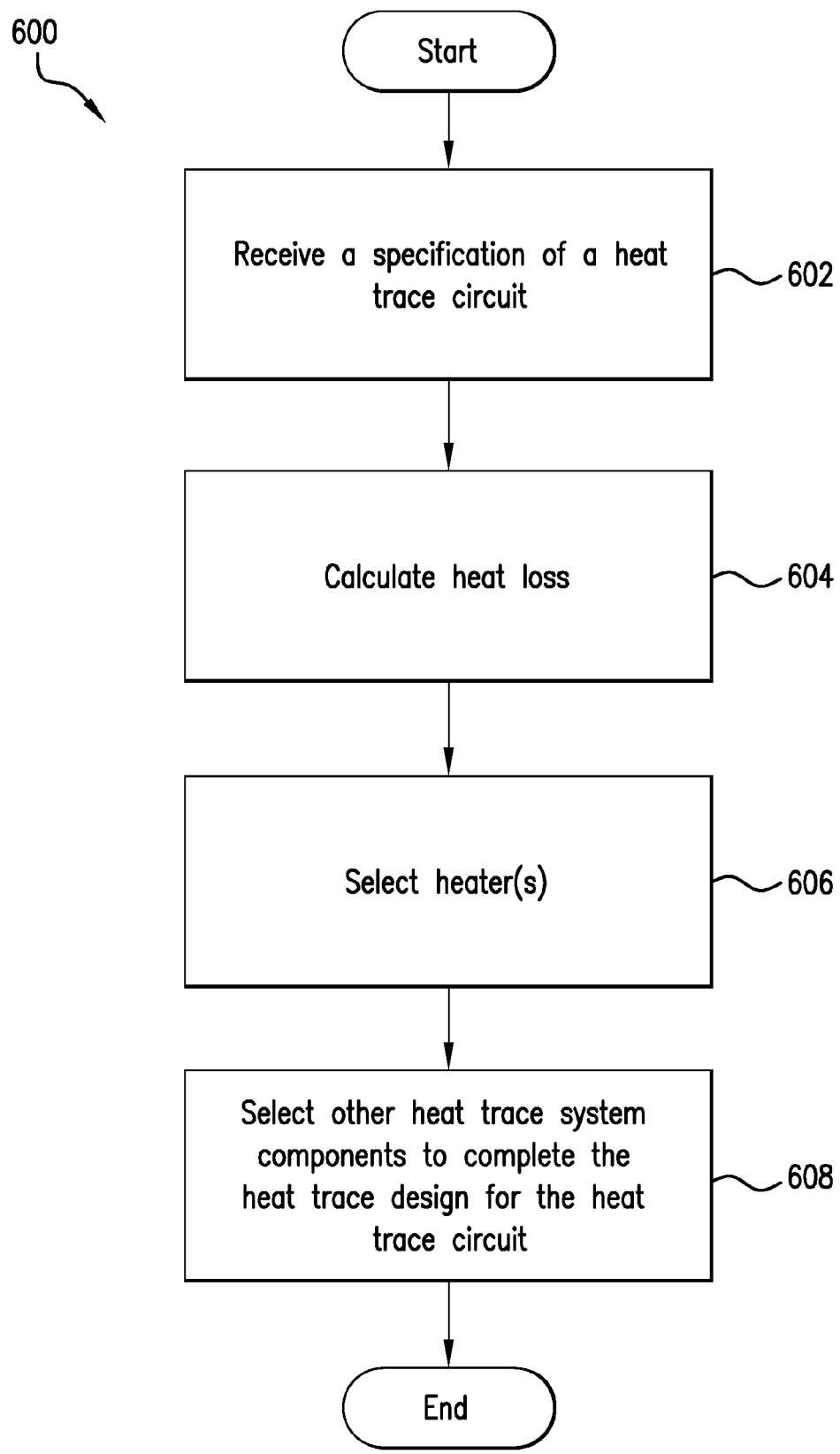
FIG. 6 illustrates an embodiment of a process for designing at least a portion of a heat trace system.

FIG. 6 illustrates an embodiment of a process for designing at least a portion of a heat trace system. In some embodiments, process 600 is employed at 206 of process 200 of FIG. 2. Process 600 starts at 602 at which a specification of a heat trace circuit (or part thereof) is received. In some embodiments, the specification of the heat trace circuit comprises specifications of one or more pipe segments that comprise the heat trace circuit. At 604, heat loss is calculated for various parts of the heat trace circuit. For example, data associated with a pipe segment is employed to calculate the heat loss of the pipe segment and/or one or more pipe system components included in the pipe segment. At 606, one or more heaters are selected for the heat trace circuit based at least in part on the heat loss calculations. For example, heaters that best meet specified heating specifications and/or heat trace system preferences are selected. In some embodiments, 606 includes determining the number of passes (i.e., the trace ratio) of the heaters for various pipe system components. At 608, other heat trace system components such as connecting components are selected to complete the heat trace design for the heat trace circuit. Process 600 subsequently ends. In some embodiments, process 600 results in the generation of a bill of materials for the portion of the heat trace system being designed. The selections at 606 and 608 may be based on specified design constraints and/or preferences. For example, the selections of 606 and 608 may be made to ensure that at least hard constraints are satisfied. Soft constraints may be attempted to be satisfied to the extent possible, and in case one or more is not satisfied, appropriate warnings (e.g., cable too long, amperage too high, temperature exceeds range, etc.) may be provided. Although described for a single heat trace circuit or part thereof, process 600 can be similarly employed for a plurality of heat trace circuits or parts thereof whose specifications are received at 602.

Figure 7:
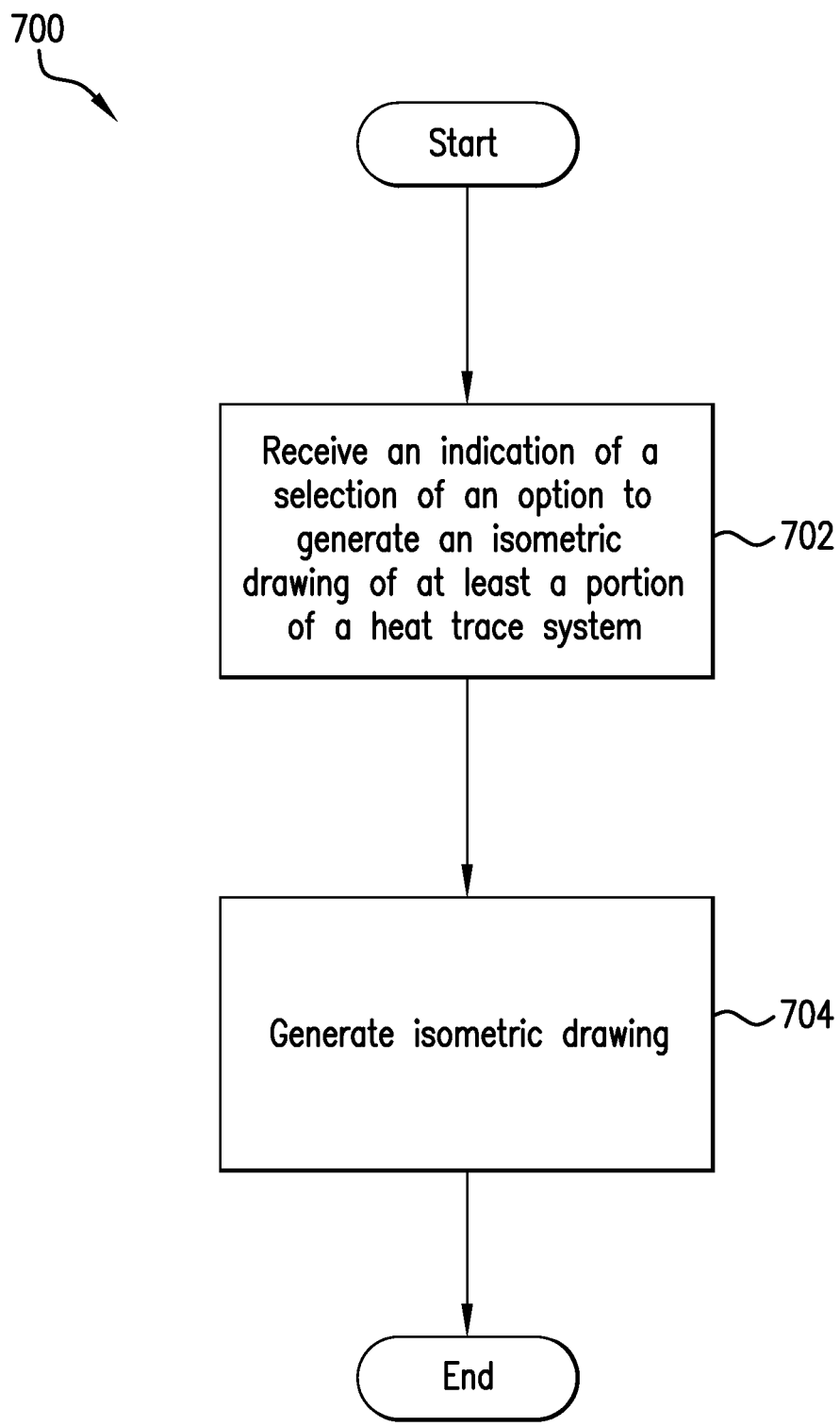
FIG. 7 illustrates an embodiment of a process for generating a heat trace isometric drawing that depicts the routing of at least a portion of the heat trace system.

FIG. 7 illustrates an embodiment of a process for generating a heat trace isometric drawing that depicts the routing of at least a portion of the heat trace system. In some embodiments, process 700 is employed at 208 of process 200 of FIG. 2. Process 700 starts at 702 at which an indication of a selection of an option to generate an isometric drawing for at least a portion of a heat trace system is received. For example, the indication of 702 may be received with respect to a particular heat trace circuit of a heat trace system. At 704, an isometric drawing is generated, and process 700 ends. In some embodiments, the drawing generated at 704 may include border information such as calculated heat trace data, the bill of materials of the heat trace system or at least of the portion of the heat trace system depicted in the drawing, temperature data, pipe system source files, etc. In some embodiments, the drawing generated at 704 may not be isometric. In some embodiments, multiple drawings may be generated at 704.

Figure 8:
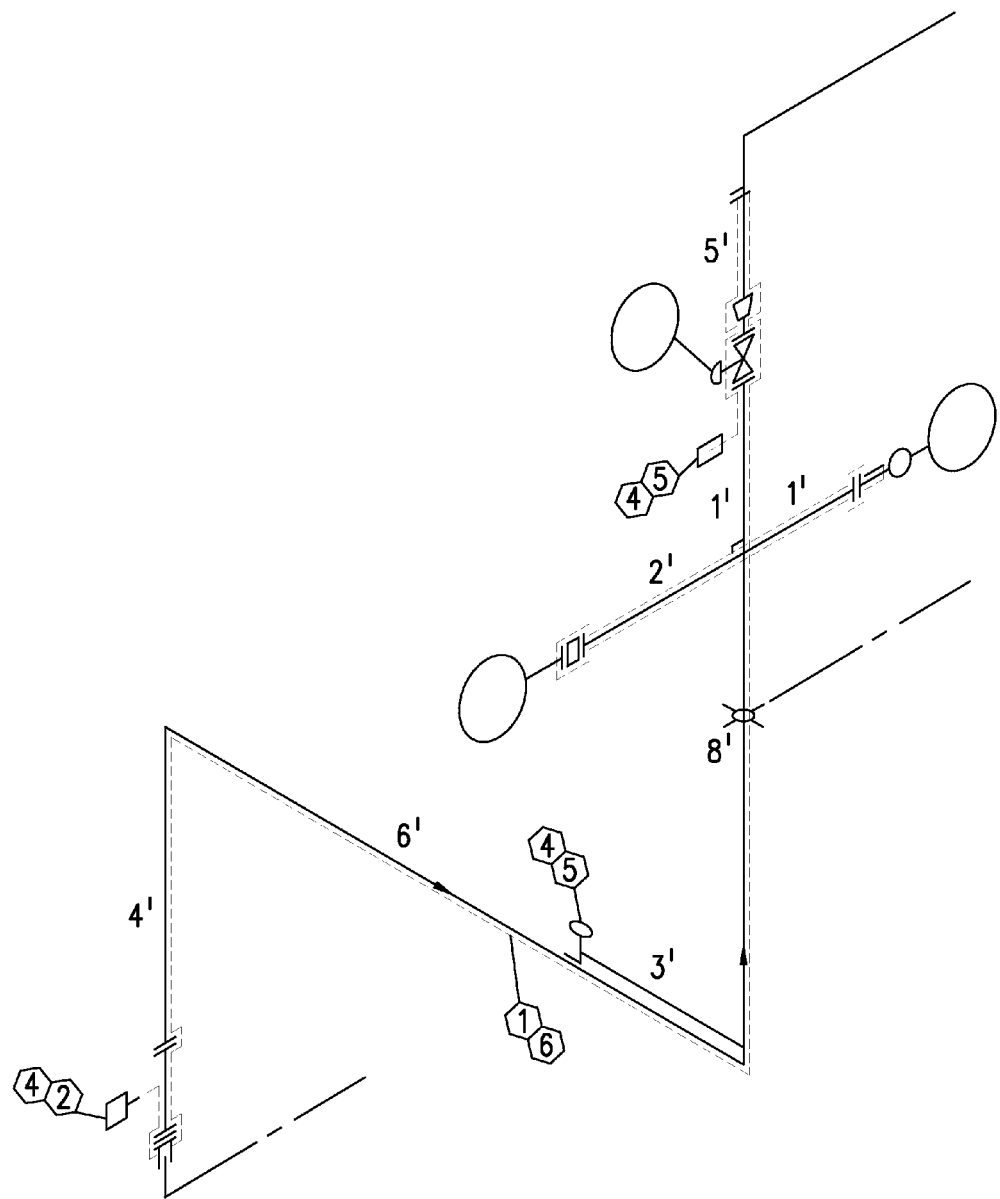
FIG. 8 illustrates a heat trace isometric drawing.

FIG. 8 illustrates an embodiment of a heat trace isometric drawing. In some embodiments, the drawing of FIG. 8 is generated at 704 of process 700 of FIG. 7. As depicted, the isometric drawing includes a variety of border information.

As previously described, in some embodiments, a single instance of pipe and heat trace design data is maintained and/or employed by all modules of a heat trace design system. This not only ensures that consistent data is used for calculating heat loss and selecting heat trace system components, generating isometric drawings of the heat trace system, and populating the border information on the isometric drawings but also ensures that changes in the source data cascade through the system.

SIMULTANEOUS HEATER SELECTION AND CABLE ROUTING

Figure 9:
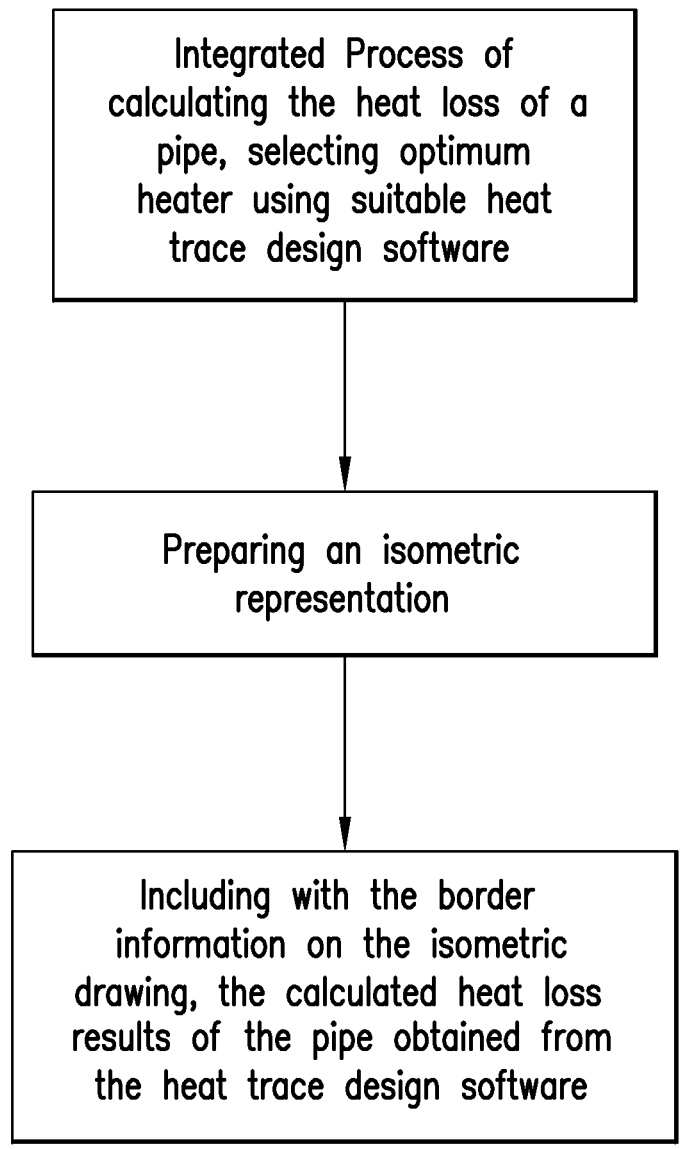
FIG. 9 illustrates an integrated process of performing the heat trace design.

Referring to FIG. 9, heat trace design, preferably includes an integrated process of (1) calculating the heat loss of a pipe, and selecting the optimum heater using a suitable heat trace design software, such as TraceCalc Pro®, (2) preparing an isometric representation, e.g., drawing, either automatically or manually, that indicates the appropriate routing of the heater on the pipe for the heat trace circuit and, (3) including with the border information on the isometric drawing, the calculated heat loss results of the pipe obtained from the heat trace design software. As seen in FIG. 9, these steps (of performing the heat trace design, namely, the heat trace design software, generation of the isometric drawing, and incorporation of the calculated results from the heat trace design software in the drawing border information) may be fully integrated. This integration of the three steps results in the simultaneous design and drawing generation based on a single instance of the pipe and design data.

As shown in FIG. 5, a three dimensional (3D) model representing the pipe is prepared. Data regarding the pipe is extracted from the 3D model representation, and passed to the heat trace design software, such as the TraceCalc Pro® heat trace design software. This enables a direct relationship to be formed between the individual pipe components covered by the circuit, and the calculated heat loss results (primarily the selected heaters). By using the direct relationships formed between the individual pipe components covered by the circuit and the calculated heat loss results, the isometric drawing that represents the heat trace circuit is generated automatically based on the same data passed to the heat trace design software. This relationship assures consistency between the calculated heat loss results and the isometric drawing. The calculated heat loss results are automatically incorporated on the border of the isometric drawing, thereby further ensuring consistency of the drawing. In this manner, the functions of heat trace design software, isometric drawing generation, and drawing border generation, are fully integrated. This results in simultaneous design and drawing generation based on a single instance of the pipe and design data.

There are many advantages attributable to the present methodology. For example, the present technology will improve the consistency of the heat trace isometric drawing. Further, it will be possible to manage the three steps of the heat trace design, described hereinabove, in a single step, and with a single instance of data. In another aspect, the present technology will ensure that changes in source data enter the system, allowing the affected circuits to be identified and revised.

DETERMINING TRACING PATH LENGTH

Additionally, the present invention includes a method for determining the length of heating cable required for a pipe and the installation of heating cable based on that determined path length. Conventionally, heat trace design of a pipe has been based on the readily calculable centerline length of the pipe. However, when the physical heat trace cable is installed on the outside of the pipe, the heat trace cable typically follows a path having a different length than the calculated centerline length, generally a length that exceeds the length using the centerline approach. The difference in length between the centerline based length, and the actual installed length of the heat trace cable, can be significant, for example, up to 10%, particularly when a large bore pipe is involved. This length difference is particularly critical for installed mineral insulated (MI) cables. Mineral insulated cables custom manufactured to a designed length in a factory have a high likelihood to be produced at an incorrect length. As a result, the centerline based lengths yielded cables are constructed having an ineffective shorter than required length. Additions to the calculated cable length, to avoid the cables being shorter than required, are prone to miscalculation and particularly inefficient for complex project. These additions to the calculated length, referred to as a "snaking allowance", are commonly based on average values.

Figure 10A:
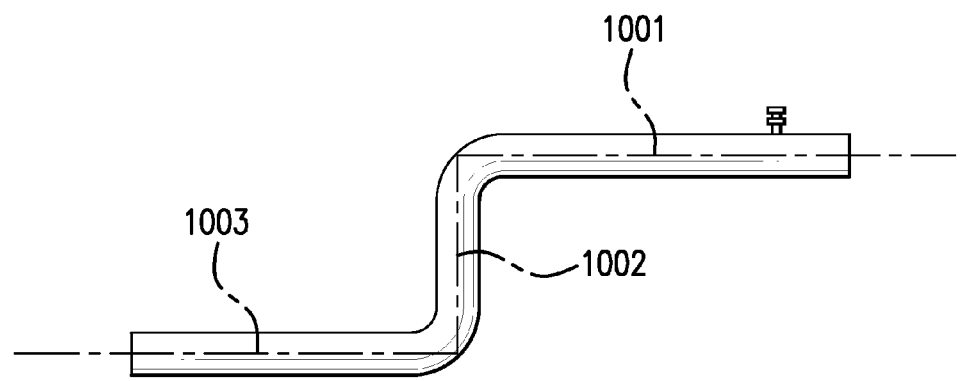
FIG. 10 illustrates an example of inaccuracies found with centerline calculations for heat trace cable.
Figure 10B:
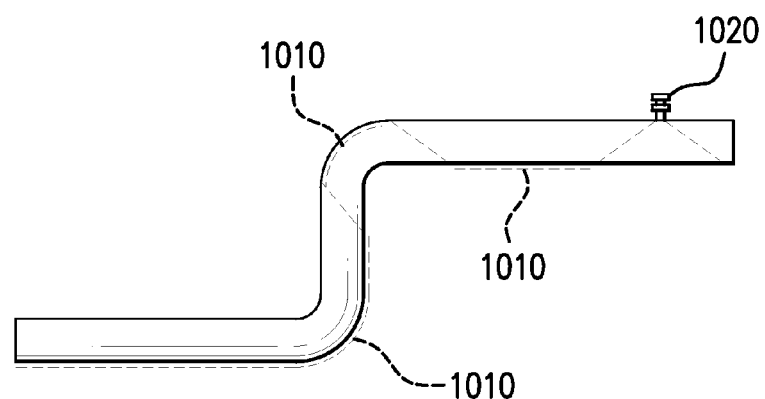

Use of centerline based lengths for producing the required heat trace cable lengths, has been the industry standard. As indicated above, use of this centerline length technique has resulted in many inaccuracies and there has been no solution available to correct the problem. In particular, use of the centerline based lengths has resulted in heat trace cables being shorter than required, or if attempting to correct this problem, having to provide snaking allowances, in some instances up to about 7%, to circuits tracing large bore pipe. On straight sections of the pipe, this often resulted in the design of significant excess cable. As seen in FIG. 10, these inaccuracies can be significant. For example, FIG. 10*a* may represent a centerline calculation of 7.04 m, with FIG. 10*b* indicating the actual total length of the heat trace to be 7.7 m. Generally, the centerline calculation shown in 10*a* provides a sum of segments 1001, 1002, and 1003, whereas the actual total length incorporate distances that include allowances along the path length 1001 for vent 1020, elbows, etc., as well as straight line distances.

Inaccuracies in calculated heat trace cable lengths, resulting from the use of centerline lengths of a pipe that are based on isometric drawings of the pipe, are particularly evident along lengths incorporating elbows, tees and reach arounds. As seen in FIGS. 11-12, the present invention overcomes errors found in conventional methodologies for calculating heating cable.

The data acquired in the 3D model representation includes information about the radius of curvature and the degree of bend for each elbow. Errors found in the calculated lengths having elbows depend on the radius of curvature and the degree of bend of the elbow. The centerline length of a given pipe can differ approximately ten percent (10%), either shorter or longer, from the actual outer arc length (the path that the tracing cable is actual traced on the outside of the pipe). In one embodiment, using the imported data, an algorithm calculates the outer arc length of the interior of the elbow. This novel approach compensates for the cumulative errors of the unknown thickness of the pipe wall and the unknown tracing path on the outermost arc. By combining the two errors together, there is a cumulative effect of each error substantially canceling the other error out, resulting in a substantially accurate calculation.

Figure 11A:
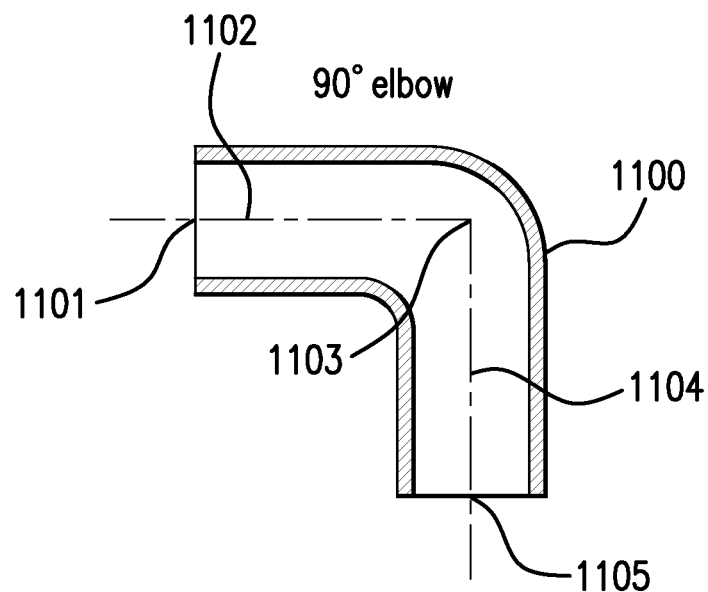
FIG. 11 illustrates an embodiment of calculations criteria for heat trace cable lengths.
Figure 11B:
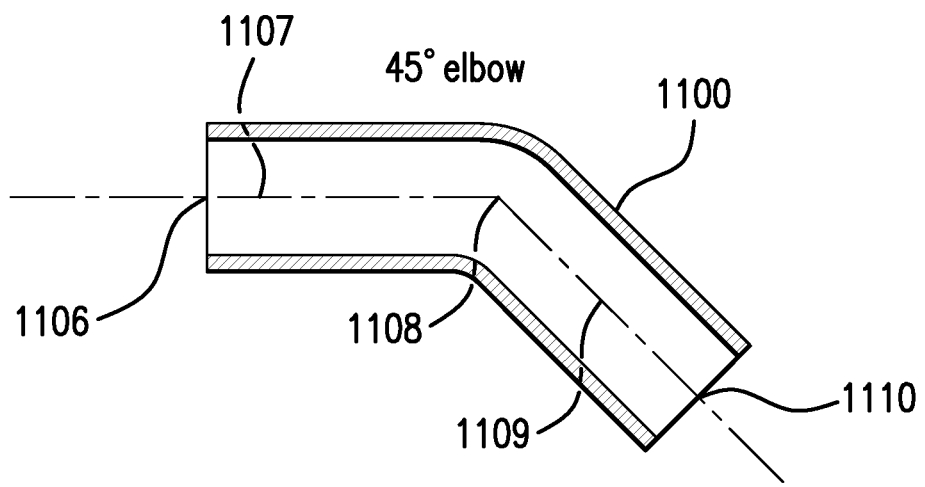
Figure 11C:
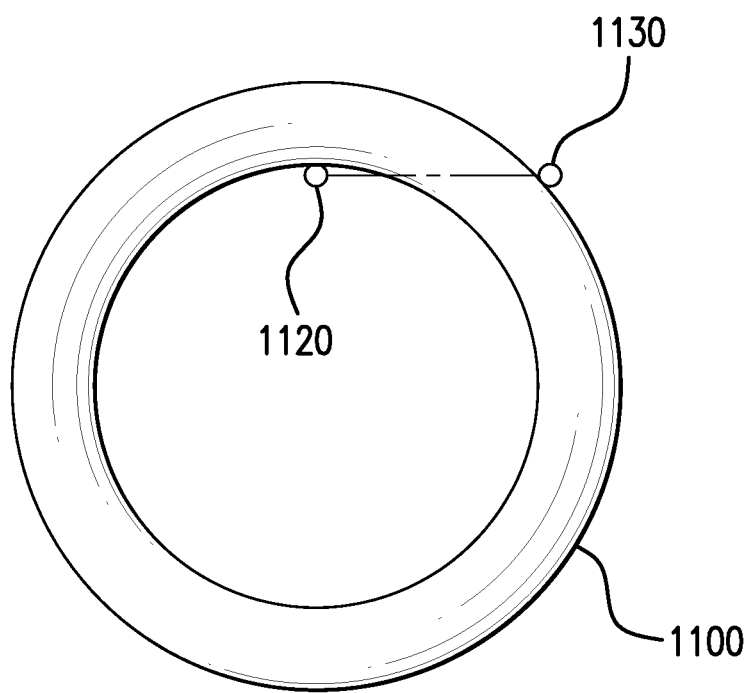
Figure 12:
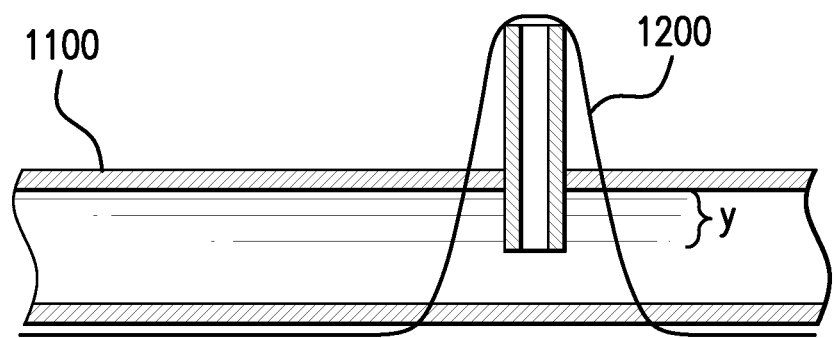
FIG. 12 illustrates an embodiment of heat trace cable placement at tee locations.

Referring to FIG. 11, a ninety degree (90°) and forty-five degree (45°) elbows are shown, in FIGS. 11a and 11b, respectively. As seen in the figures, three points (1101, 1103, 1105 in FIGS. 11a and 1106, 1108, 1110 in FIG. 11b) and an inner diameter are used to calculate the surface of a given pipe 1100. Also shown in FIG. 11c, the pipe size (diameter) is based on the known inside surface diameter to represent an estimated outer surface diameter being a horizontal off-set from the upper-most (or lower-most) region within the interior of the pipe to the exterior of the pipe (as shown the offset between cable 1120 and cable 1130). For example, a calculation of the path that a cable takes when applied to an elbow could be calculated from basic component information of the elbow. The component information may include a center point of the face of the elbow at the point that the elbow connects to the first adjacent pipe, a point where the centerline of the two adjacent pipes connecting to either side of the elbow intersect, and the center point of the face of the elbow at a point that it connects to the second adjacent pipe and the diameter being equal to the inside diameter of the elbow may be used. The physical cable is preferably not installed on the outer arc of the pipe, i.e., it is off-set for safety, therefore FIG. 11 represents the effect of the cancellation of the effect of an inner bore diameter with the actual placement of the cable on the outside.

An example of a heat trace of a tee is shown in FIG. 12. Errors found in calculated lengths incorporating tees, the traditional length of a vent is the distance from the center line of the parent pipe to the top of the vent which includes a distance y that is not physically present as part of the vent. With large bore pipe, the vent appears to be much longer than it actually is. This applies to all tees, not just vents. In one embodiment, subtraction of the radius of the parent pipe from the length of the Tee pipe eliminates the error attributable to the Tees.

Figure 13:
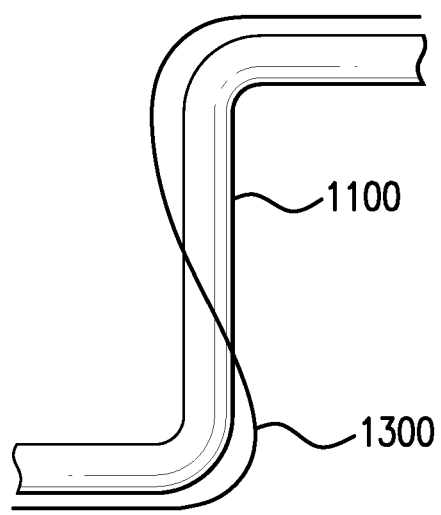
FIG. 13 illustrates an embodiment of a Reach Around heat trace cable placement.

As seen in FIG. 13, Reach Arounds induce errors in the calculated lengths from the actual length of traced heating cable 1003 because of placement of the heating cable on the pipe. When the heating cable is placed near the bottom of the pipe (either between four-to-five o'clock or seven-to-eight o'clock), additional heating cable is needed o reach the outside of an elbow or vent of the pipe.

A "Reach Around" occurs at elbows and tees and is dependent on which side of the pipe the cable is placed. In a preferred embodiment, because on average each elbow will require one reach around, the number of elbows by a given circumference is used to produce a reliable estimation of length. For example, multiplying the number of elbows by 3/16*(the circumference of the pipe) the circumference will produce a reliable estimation of this length for that diameter of pipe. The user may choose to override the count value if an unusual tracing path is designed. If a tee resides on the opposite side of the pipe from the tracing, additional cable of 3/8*the circumference of the parent pipe may be calculated (two 3/16*the circumference allowances for a loop, or one 3/8*the circumference for a tee-kit). The present invention allows for the inclusion, if warranted, of additional cable length based on the orientation of the tee.

The present method enables one to more accurately determine the length of heat trace design cable that is traced along a given pipeline. One significant advantage of the process, and manufacture of heating cable length based on the process, includes the production of accurately lengths of heating trace cable, whether in a production facility or on-site, that are readily installed, as compared with the difficulty associated with having to distribute and install excess heating trace cable in an even manner, commonly referred to as "snaking". This advantage is particularly pronounced in production runs of heating cable having relatively small snaking allowances, as the present invention reduces the possibility of heating cables being manufactured at lengths that are too short for a given length of traced pipe. As evident in these advantages, with the increased accuracy in heating trace cable lengths, and the reduced occurrence of snaking allowance, efficient installation of heating cables results.

HEAT TRACING MATERIAL MANAGEMENT

Flexible Work Breakdown Structures

In many instances for the installation of heat tracing, particularly in large projects, there is a strong need to break up the procurement and installation of materials into manageable work packages. This need to provide manageable work packages is particularly important for projects that utilize "modular construction" techniques. Modular construction techniques are commonly used in projects where construction of individual parts of a plant, or other type of facility, is accomplished in a location that is remote from location of the facility. This may be done for one or more reasons, such as the existence of a limited labor force, adverse environmental conditions at the facility site, space limitations at the facility, etc. Modular constructions allow the facility to be split into discrete modules that are constructed in individual convenient location or "module yard" and shipped to the facility site where they are connected together. One significant problem encountered in modular construction is the shipment of construction materials for each module being sent to the correct module yard. This is particularly problematic for heat tracing systems having the typical inherent difficulty when one heat trace circuit may span multiple modules.

The present invention includes a process of servicing module yards with correct units of heat tracing cable by using a hierarchy representing the customer's Work Breakdown Structure (WBS). The present invention creates a WBS hierarchy and delivery of heating cable based on the WBS hierarchy. The WBS hierarchy preferably includes "nodes" or WBS elements. The WBS nodes may include multiple entries, for example 800 entries, simplifying an ordering process.

Preferably the WBS hierarchy includes multiple levels, such as for example, four or five levels. In one embodiment, a large construction project may be split into a number of areas, each split into a number of plants, which are further divided into modules. As heat trace circuits are created, each segment in a circuit can be assigned to a WBS element. This is preferably done by being manually entered, retrieved from a process data sheet and automatically populated, and/or retrieved from the model data files and automatically populated. As Bill of Materials (BOM) for a heat tracing circuit are generated by the heat trace design software, the materials are stored at the segment level. Since each segment is associated with a WBS element, all materials for a WBS element can be easily retrieved to create a material requisition or shipping request. Materials can also be aggregated at any level in the WBS hierarchy. The solution is preferably enabled by housing all data for a project in a single database and by storing the materials at the most granular level, such as for example, at this segment level. As such, the now modular components of the system are presented as a hierarchy, allowing shipment of materials relative to changes in data that is the basis of the heat tracing calculations, discussed below.

For example, with identification of a pipe (by size, location, or other attributes), the specific pipe is identified to a given module. When the pipe location becomes moved to a second (different) module, a revised BOM is created to incorporate the pipe to the second module, including the accessories for installing the heating cable.

Material management presents a huge challenge on large projects. Determining what material needs to be shipped in this manner assures the correct amount of material is shipped, resulting in time and material efficiencies. In addition to being presented for construction/material management, the WBS may be presented within an accounting prospective. This allows management of the progress of the project, and management of materials and reporting requirements.

Change of Heat Tracing Data Management

The present invention further allows management of change of heat tracing data. In most heat tracing projects, client model and process data routinely change as the project progresses. As one of the generally last steps in the construction process, heat tracing of a facility is under pressure to respond to those changes as quickly as possible. The challenges is to efficiently detect client changes, determine the impact of those changes on existing designs, and to track the change and its impact to justify additional project charges.

The present invention provides a process for detecting changes in a heat tracing project, identifying the impact of these detected changes, tracking these changes and their impact, and installing the heat tracing cable in response to these changes.

Detection of changes in the heat tracing project is generally accomplished using a comparison methodology. Typically, project model data, that is the basis of the heat tracing project, is provided in a number of model files, such as in IDF or PCF format, with each model file containing a collection of pipe components. As the heat tracing project evolves, these model files are revised and pipe components may be added, deleted or moved between files. In order to accurately and efficiently detect revised files, each imported pipe component is inspected to determine duplication of a previously-imported component. Duplication indicates that the file has been revised. As such, this inspection step provides a significantly more reliable review of the project than the conventional, and error prone, method of using the file names to indicate revisions in the files.

This inspection step is preferably followed by an acceptance or rejection of the file containing the duplicate component. As there is a possibility that a revised file was received in error and is outdated, this acceptance step reviews the proper incorporation of the revised file into the heat tracing project. For example, a reviewer accepts or rejects each identified duplicative file. For example, process data may be imported from a word document program, such as an Excel® program, produced by MicroSoft Corporation of Redmond, Wash., United States. Each process line, described by one or more model files, is represented by a row in the process data sheet. Heat trace circuit design temperatures and other process data are imported from this file. Changes to these design parameters are detected each time the process data sheet is imported. To manage larger projects, which may contain thousands of process lines, related process lines may be grouped into pipe systems. Each pipe system can then covered by a collection of circuits during a circuit design process.

An additional step of both the process data import and the model data import is an inspection of the impact of changes to existing pipe systems and circuits. In one preferred embodiment, two lists are involved in displaying the impact of change: a Control Tower tree view and a Circuit Designer tree view. The Control Tower tree view lists pipe system names within the project and the Circuit Designer tree view lists the circuit names for a given pipe system. As impacts are determined, these names are highlighted to guide the user to the change.

Data changes may affect the project in several ways. The introduction of new model files may be additional requirements, duplicative requirements, or conflicting requirements. For example, the pipe system may be revised but the revisions have no impact on the existing heat tracing circuits. This may be categorized as the lowest level of impact. It indicates that the pipe system needs inspection to determine whether heat tracing cables need to be added or altered within the project as a result of changes in the pipe system. In a particular example, if pipe is added adjacent to an existing heat tracing circuit, the circuit may need to be extended to incorporate the new pipe. To guide the user to this change, the pipe system name may be highlighted, such as in yellow. This highlight disappears when the Circuit Designer is launched on the pipe system.

In another change, circuits may be impacted by process data change. When a process line's design parameters are changed, circuits covering that line are to be reassessed. To guide the user to the change, the pipe system name may be highlighted, such as in red, and the circuit name also may be highlighted, such as in orange. The highlight disappears from the circuit name once the user saves changes to the circuit. The red highlight disappears from the pipe system name once all highlights have been removed from its circuits.

Additionally, circuits may be impacted by a model data change. When the model data covered by a circuit is changed, this may be considered as the highest level of impact. Each circuit maintains a complete record of all pipe components that it covers. If any components are changed, the circuit is invalidated. The circuit structure containing all manually input circuit and segment data remains in place. However, all pipe information (length, type, diameter, heat sinks, etc.) is cleared and the associated pipe components are released. To indicate that this has occurred, both the circuit name and the pipe system name may be highlighted, such as in red. This highlight disappears from the circuit name once the user saves changes to the circuit. The highlight disappears from the pipe system name once all highlights have been removed from its circuits.

An additional preferred step of the process is to track the change in order to provide the backup information required by the project management team. Reliability in a tracking system reduces challenges to an installed heat tracing system. Additionally, automatically generated records reduce the effort required for actual changes in installing the heating cable. Two key aspects to tracking change are historical project data record and the change log, which can be summarized for project management reporting.

Historical project data record includes a record of each model data file and its components are stored in the database each time it is imported. This is stored along with the import session record, which maintains the user name and date/time of the import. As model data is revised and updated, records being replaced are end-dated but not removed from the database. Records without an end-date represent the current state of the project. This temporal storage model is also used to maintain a record of all designed circuits, whether they are active or have been superseded. Together, these historical records contain enough information to recreate the state of any circuit that was issued from the system. They also contain the data required to report the scope of a project, including the total amount of pipe and components, for any point in history.

A change log, or summary record, may be used. As the impacts to the heat tracing circuit are determined, a summary record is inserted in a change log for the project. In addition to the source of the change and the impact, this record also includes other useful information, such as the name of the user who imported the data, the date/time, etc. To correlate changes with the subsequent redesign efforts, summary records may also be inserted into the change log each time that a circuit is revised.

With efficient accounting for changes in the provided project data, installation of the heating cable is accomplished in a relatively error free manner.

For example, the input of a temperature change for a pipe may be included in a revised or change scope requirement. This change is analyzed to detect the impact on the heat trace system of the pipe causing the heat trace system to be redesigned, generally as part of the complete heat trace system.

Advanced Display of Circuit Data for Heat Tracing

Additionally, the present invention provides comprehensive analysis, or quality assurance, of the installation of heat tracing cable in a given project. In contrast to the tremendous amount of manual effort that is normally required to install correct lengths of heating cable, and review of such installation that the heating cable was correctly manufactured and installed, the present invention produces correct lengths of heating cable for a given installation environment, that accounts for changes within an on-going project. The present invention ensures that all heat tracing that is part of the scope of the project has been completed. This is particularly applicable for project managers who monitor either parts or the entire scope of the heat tracing project relative to the extent of what has been designed, procured, installed, and commissioned.

Validation of all heating circuits to specified design criteria has conventionally been extremely time consuming. Validation includes determining whether data used to design and manage the heat tracing system is correct. In certain environments the correct area classification must be followed for each region of a plant. For example, if explosive gasses may be present in a region then careful design rules must be followed to ensure the gasses are not ignited by high heater sheath temperatures. Further, numerous power distribution panels may be located within a facility. As heat trace circuits are assigned to panels, it is difficult to determine the optimum panel assignment for selected heating circuits and which heat tracing circuits should be moved when a panel is full. The present invention provides for the optimum installation of heat tracing cable within a facility to account for these and other criteria.

Design and installation of the heat tracing cable is predicated on the use of software to provide a color 3D model of the plant to show the desired circuit information is used. This tool provides a window which displays the 3D model of the plant. Preferably allowing the ability to pan, zoom and rotate the model. With this functionality, a user may virtually "walk" through the plant and inspect any section of pipe from any angle. The software tool may further call-out attributes representing the physical project. Circuits that constitute part of the design plan contain many attributes which are of great interest to various users. Many of these attributes can only be set to one of a discrete list of values. For example, a circuit design progress attribute can be assigned a value of Design-In-Progress, Issued For Approval, and Issued For Construction. Each of these values is preferably associated with a unique color in a manner for creating a color scheme for that attribute. As heat trace circuits are designed in the system, the circuits are related to the specific pipe components that they cover. This relationship allows the individual pieces of pipe, within the 3D model of the plant, to be colored according to a selected color scheme. This allows the user to see the status of all circuits at a glance and to move around in the 3D model to inspect any areas of concern. In one preferred embodiment, only one color scheme is active at a time. Some color schemes may represent many different states. In this case, it becomes difficult to distinguish the various colors in the model. To assist with this, the user can select one state from the color scheme and all other states will be set to dark grey, thereby de-cluttering the image to highlight the selected state. Color schemes may be used to indicate functionality, purpose, type or other attributes of parts of the heat trace system, pipe system, etc.

Preferably, within this tool, three classes of data are used to create these color schemes. The first class, Circuit Progress Attributes, is a class of attribute introduced above. These attributes allow project managers to monitor the progress of a project and to detect areas of concern. Status information may include all phases of a project; design, procurement, construction, and commissioning. Each of these phases has a color scheme of its own and there is an overall color scheme showing the phase each circuit is in. These color schemes may also show some information from the model itself. For example, an attribute in the model may indicate whether a particular section of pipe requires tracing. Two colors may be reserved to show the state of that attribute. Therefore the Circuit Design Progress color scheme preferably shows a unique color for the states of (1) does not require tracing; (2) requires tracing but not started; (3) design in progress; (4) issued for approval; (5) issued for construction.

A second class of data includes Circuit Segment Attributes. A circuit may be made up of many segments and each segment is related to the pipe components that it covers. Typically a new segment is created each time the heat loss characteristics of the pipe changes or at decision points, e.g., Tees. These attributes include, for example, without limitation, area classification, location (indoor, outdoor, etc), and the work breakdown structure (WBS) element. These attributes include input parameters to the heat trace design software. Color schemes for these attributes provide a powerful quality assurance capability. At a glance, all of the circuits in a project can be validated to ensure that the correct input parameter was selected by the designer. Considering, the example, where the selected color scheme displays the Area Classification that was chosen for the segment. If all pipes in a hazardous area are green except one that is magenta then it will be instantly obvious that a design error was made and it can be corrected immediately. Likewise a color scheme can be setup to reflect the customers work breakdown structure (WBS). A particular module may be shown as yellow so if a blue pipe is present in the area then it indicates that an incorrect WBS element was selected for that segment. This allows the procurement manager to validate that all materials will arrive at the correct location prior to placing the order.

A third class of data includes Circuit Design Attributes. From a technical aspect, these attributes are very similar to the Circuit Progress Attributes. These attributes assist in the design process and provide useful quality assurance and project summary data. These attributes include, for example without limitation, power distribution, electrical, heater type, temperature and control method. Primarily these include input parameters to the design process. For example, a color is associated with each Power Panel and all circuits connected to that panel are given that color. By selecting one panel in the color scheme all other circuits are set to dark grey. This quickly shows outlying circuits that should be connected to a different panel for design optimization.

The present invention ensures that the scope of heat tracing work for a give project was completed or that all designs adhered to the set specifications. Area classification check provides a significant tool of the quality process, which together with the easy access to progress data and optimization of power distribution design, increases the efficiency of installing heat tracing.

The foregoing description of the invention is exemplary and is not intended to be limiting. Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of manufacturing a heat trace cable, the method comprising:
  receiving three dimensional pipe system data, the three dimensional pipe system data including pipe locations within a pipe system and data associated with a plurality of pipe system components;
  receiving a first pipe system component selected from the plurality of pipe system components;
  automatically extracting data associated with the first pipe system component and at least one second pipe system component, the at least one second pipe system component configured to be placed in a vicinity of the first pipe system component, the first pipe system component and the at least one second pipe system component sharing at least one of a heat loss characteristics and a heater selection criteria, the automatically extracted data relating to heat trace system component selection;
  determining a length of the heat trace cable for the first pipe system component and the at least one second pipe system component based at least in part on the automatically extracted data; and,
  manufacturing the heat trace cable to the determined length.

2. The method of claim 1, wherein the heat trace cable is a mineral insulated cable.

3. The method of claim 1, wherein the heat trace cable is a polymer insulated cable.

4. The method of claim 1, wherein the determined length of the heat trace cable has an error amount of less than about five percent over an actual length required for installation.

* * * * *